(12) United States Patent
Vasudevamurthy

(10) Patent No.: US 10,803,216 B1
(45) Date of Patent: Oct. 13, 2020

(54) COMBINATIONAL LOGIC CIRCUIT OPTIMIZATION

(71) Applicant: Xilinx, Inc., San Jose, CA (US)

(72) Inventor: Jagadeesh Vasudevamurthy, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/272,701

(22) Filed: Feb. 11, 2019

(51) Int. Cl.
  *G06F 30/327* (2020.01)
  *G06F 30/34* (2020.01)
  *G06F 30/3312* (2020.01)
  *G06F 119/12* (2020.01)

(52) U.S. Cl.
  CPC ........ *G06F 30/327* (2020.01); *G06F 30/3312* (2020.01); *G06F 30/34* (2020.01); *G06F 2119/12* (2020.01)

(58) Field of Classification Search
  USPC ........................................................ 716/132
  See application file for complete search history.

(56) References Cited

U.S. PATENT DOCUMENTS

| | | | | |
|---|---|---|---|---|
| 5,572,712 A * | 11/1996 | Jamal | ....................... | G06F 30/30 716/55 |
| 6,484,292 B1 | 11/2002 | Jain et al. | | |
| 7,657,855 B1 | 2/2010 | Manaker, Jr. et al. | | |
| 9,483,597 B1 | 11/2016 | Das et al. | | |
| 2010/0257494 A1* | 10/2010 | Pouarz | ................ | G06F 30/3323 716/111 |
| 2015/0186561 A1* | 7/2015 | Teig | ....................... | G06F 30/327 716/134 |
| 2015/0324512 A1* | 11/2015 | Teig | ....................... | G06F 30/327 716/134 |
| 2015/0324513 A1* | 11/2015 | Teig | ........................ | G06F 30/20 716/113 |
| 2015/0324514 A1* | 11/2015 | Teig | ........................ | G06F 30/20 716/134 |

\* cited by examiner

*Primary Examiner* — Mohammed Alam
(74) *Attorney, Agent, or Firm* — Patterson + Sheridan, LLP

(57) ABSTRACT

Examples herein describe techniques for optimizing a hardware design for an integrated circuit. Instead of trying multiple optimization strategies each time design code is synthesized, the embodiments herein describe identifying the optimal or best optimization strategy for a particular combinational module in the design code only one time. Then, each time the design code is synthesized in the future, a synthesis tool recognizes the combinational module and selects the best optimization strategy. To do so, the synthesis tool generates a signature using the circuit structure represented by a netlist. The synthesis tool traverses the netlist and assigns unique integers to the primary inputs, the combination instances, and the primary outputs. These integers can then be fed into a signature generator which outputs a signature for the combinational module.

20 Claims, 5 Drawing Sheets

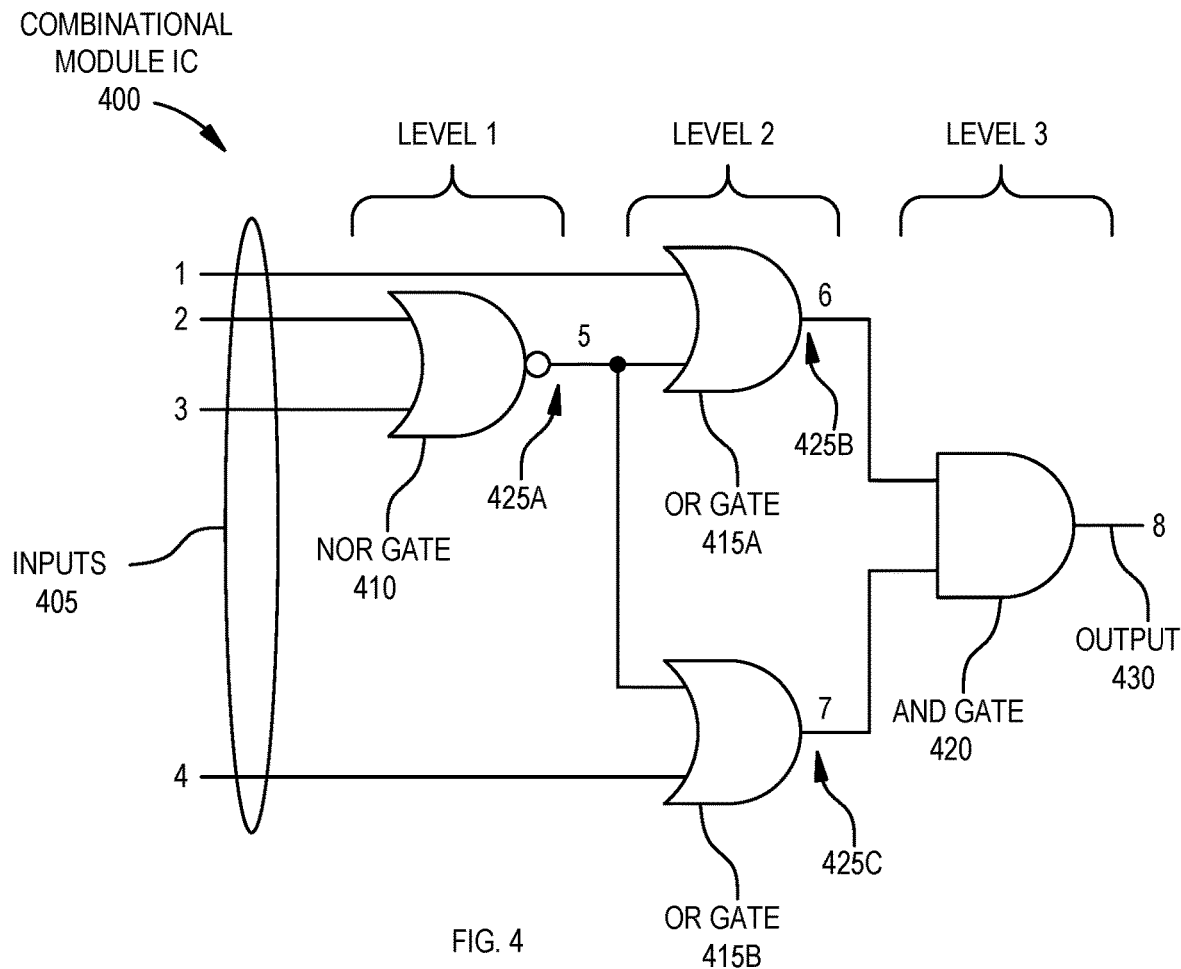
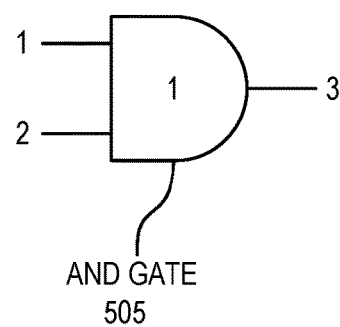
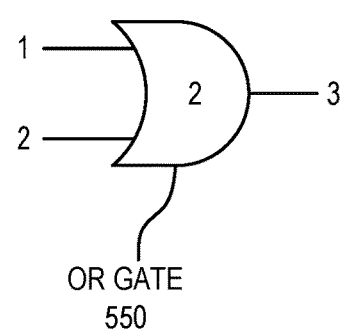
FIG. 4
FIG. 5

COMBINATIONAL LOGIC CIRCUIT OPTIMIZATION

TECHNICAL FIELD

Examples of the present disclosure generally relate to using signatures generated from non-optimized netlists to select an optimization strategy for optimizing the circuitry corresponding to the netlist.

BACKGROUND

Optimizing a hardware design described in a high level hardware description language (HDL) is a difficult and time consuming process. Typically, a synthesis tool tries many optimization strategies on a HDL design and then selects the most optimal one of the strategies when creating the hardware implementation of the design. Hardware designs often have multiple combinational modules which the synthesis tool separately evaluates in order to identify the optimal optimization strategy. That is, the combinational modules in the same design may be best optimized by different optimization strategies. As a result, optimization can take a significant amount of time which slows down the synthesis process performed on the computing system.

SUMMARY

Techniques for synthesizing hardware circuitry are described. One example is a method that includes receiving a netlist defining a circuit comprising a plurality of circuit elements, assigning unique integers to inputs in the circuit, assigning unique integers to combination instances within the circuit, assigning unique integers to outputs of the circuit, generating a signature for the circuit using the unique integers assigned to the inputs, the combination instances, and the outputs as inputs to an error correction function, determining that the signature matches a previously saved signature, and optimizing the netlist using an optimization strategy corresponding to the previously saved signature.

One example described herein is a host computing system that includes a processor and memory comprising a signature generator and an optimizer. The signature generator is configured to receive a netlist defining a circuit comprising a plurality of circuit elements, assign unique integers to inputs in the circuit, assign unique integers to combination instances within the circuit, assign unique integers to outputs of the circuit, generate a signature for the circuit using the unique integers assigned to the inputs, the combination instances, and the outputs as inputs to an error correction function, and determine that the signature matches a previously saved signature. Moreover, the optimizer is configured to optimize the netlist using an optimization strategy corresponding to the previously saved signature.

One example described herein is a non-transitory computer readable storage medium comprising computer readable program code embodied thereon, the program code performs an operation when executed on a computer processor. The operation includes receiving a netlist defining a circuit comprising a plurality of circuit elements, assigning unique integers to inputs in the circuit, assigning unique integers to combination instances within the circuit, assigning unique integers to outputs of the circuit, generating a signature for the circuit using the unique integers assigned to the inputs, the combination instances, and the outputs as inputs to an error correction function, determining that the signature matches a previously saved signature, and optimizing the netlist using an optimization strategy corresponding to the previously saved signature.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 illustrates a circuit with circuit elements that are assigned unique integers, according to an example.

FIG. 5 illustrates circuits with logic gates that are assigned unique integers, according to examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
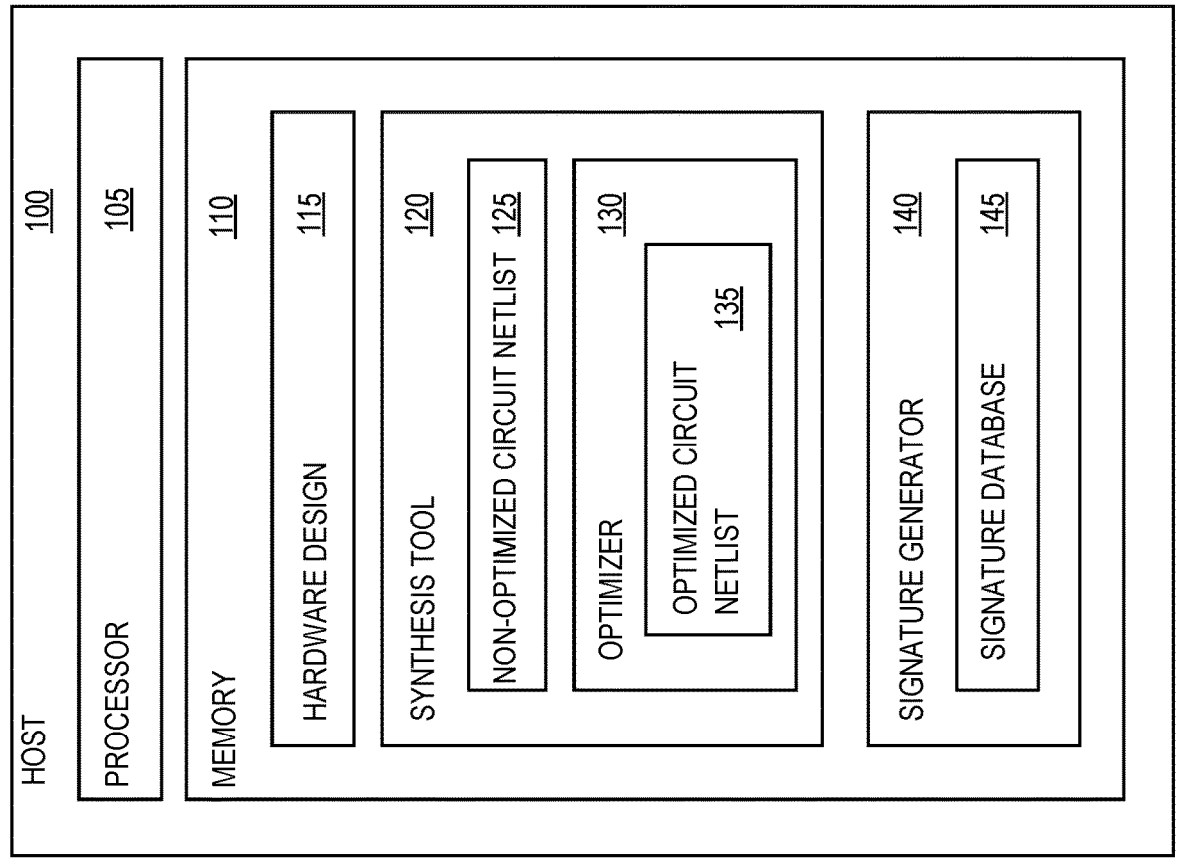
FIG. 1 is a block diagram of a host computing system that synthesizes a hardware design into optimized hardware, according to an example.
Figure 1:
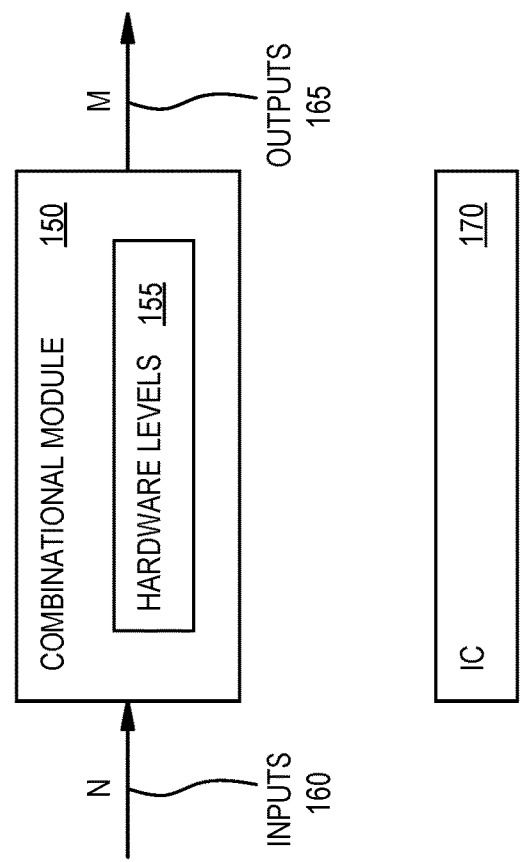

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for optimizing a hardware design for an integrated circuit (IC). As mentioned above, there are many different optimization strategies that can be used when converting design code expressed in HDL (e.g., Verilog or VHDL) into circuitry for an IC such as a non-programmable application specification IC (ASIC) or a programmable IC (e.g., a field programmable gate array (FPGA) or programmable logic device). Because trying multiple optimization strategies each time the design code is synthesized can take a long time (or a large amount of computer resources), the embodiments herein describe identifying the optimal or preferred optimization strategy for a particular combinational module in the design code only one time. Then, each time the design code is synthesized in the future, a synthesis tool recognizes the combinational module and selects the optimal optimization strategy, thereby improving the operation of the computing system hosting the synthesis tool.

To identify the combinational module, the synthesis tool generates a signature using the circuit structure represented by the combinational module. In one embodiment, the combinational module is a non-optimized netlist which expresses connections between circuit elements (e.g., logic gates and/or look-up tables). The synthesis tool can traverse the netlist and assign unique integers to the primary inputs, the outputs of the circuit elements, and the primary outputs. Additionally, the synthesis tool can assign integer values to the circuit elements themselves (e.g., an OR gate is assigned 1, an ADD gate is assigned a 2, and look-up table (LUT) is assigned a 3, and so forth). These integers can then be fed into signature generator which outputs a signature for the combinational module. The likelihood that two combinational modules will have the same signature may be less than one in one billion.

By identifying the signatures for the combinational modules in a design code (which is fast linear operation), the synthesis tool can easily determine whether those signatures match previously stored signatures in a database that are matched to optimization strategies that have been found to be the best or optimal strategies. Put differently, if a combinational module in the design code being synthesized has the same signature as a signature already stored in the database, the synthesis tool can use the corresponding optimization strategy to convert the combinational module into a circuit. In this manner, the synthesis tool can use the signatures to identify the best optimization strategies for different combinational modules in the design code which can improve the operation of the computing system performing synthesis.

FIG. 1 is a block diagram of a host computing system (host) 100 that synthesizes a hardware design into optimized hardware, according to an example. The host 100 includes a processor 105 which represents any number of processing elements which each can include any number of processing cores. The host 100 also includes a memory 110 which can include volatile or non-volatile memory elements.

The memory 110 includes a hardware design 115, a synthesis tool 120, and a signature generator 140. In one embodiment, the hardware design 115 is expressed in HDL that describes, at a high-level, a hardware system. For example, the hardware design 115 may describe the hardware system using functional blocks rather than specific circuit elements (e.g., logic gates or LUTs).

The synthesis tool 120 converts the high-level HDL in the hardware design 115 into a non-optimized circuit netlist 125. In one embodiment, the synthesis tool 120 (or another compiler) performs a "rough" or intermediate synthesis to convert the HDL in the hardware design 115 into circuit elements which are represented in the netlist 125. The circuit formed by these circuit elements (i.e., the circuit defined by the netlist 125) is non-optimized. The non-optimized circuit netlist 125 may also be called a non-optimized combinational circuit.

The synthesis tool 120 includes an optimizer 130 which, using an optimization strategy, optimizes the non-optimized circuit netlist 125 to generate an optimized circuit netlist 135. This netlist 135 can then be used to generate the represented hardware circuitry in an IC 170. In one embodiment, the netlist 135 is provided to a fabrication system which produces an ASIC that includes the circuitry defined by the netlist 135. In another embodiment, the optimized circuit netlist 135 is converted into a bitstream that is transmitted to a programmable IC to program a logic gate array to include the circuitry defined by the netlist 135.

As mentioned above, there are many different optimization strategies for converting the non-optimized circuit netlist 125 into an optimized circuit netlist 135. However, forcing the optimizer 130 to test all of these optimization strategies each time the hardware design 115 is synthesized can delay development of the hardware system. For example, optimization may take too long, or require too many compute resources. Instead, the host 100 includes a signature generator 140 which maintains a signature database 145 for identifying the optimal or preferred optimization strategies for the combinational modules. In one embodiment, the signature database 145 stores a plurality of signatures which each correspond to an optimal or preferred optimization strategy. That is, each signature stored in the signature database 145 is mapped to a corresponding optimization strategy.

As described in more detail below, the signature generator 140 uses the information contained in the non-optimized circuit netlist 125 to generate a psuedo-unique signature for the netlist 125. For example, FIG. 1 illustrates a combinational module 150 that corresponds to the non-optimized circuit netlist 125. That is, the combinational module 150 may include the circuit elements defined in the netlist 125 which are arranged in one or more hardware levels 155. To generate a signature for the combinational module 150 (and the non-optimized circuit netlist 125), the signature generator 140 traverses the combinational module 150 from the inputs 160, through the hardware levels 155, and to the outputs 165. When doing so, the signature generator 140 assigns integers to the inputs 160, combination instances in the hardware levels 155, and the outputs 165 which are then used as inputs to an error correction function to output a signature (e.g., a 16, 32, or 64 bit value).

The signature generator 140 can compare the signature to signatures stored in the signature database 145. If there is a match, the signature generator 140 can send the optimization strategy corresponding to the matched signature to the optimizer which can then use that optimization strategy to convert the non-optimized circuit netlist 125 to the optimized circuit netlist 135. As described below, the optimization strategy has already been proven to be an optimal (e.g., the preferred) optimization strategy for that combinational module 150. Thus, rather than the optimizer 130 attempting to determine the optimal optimization strategy to use, the signature generator 140 can provide that information to the optimizer 130.

Figure 2:
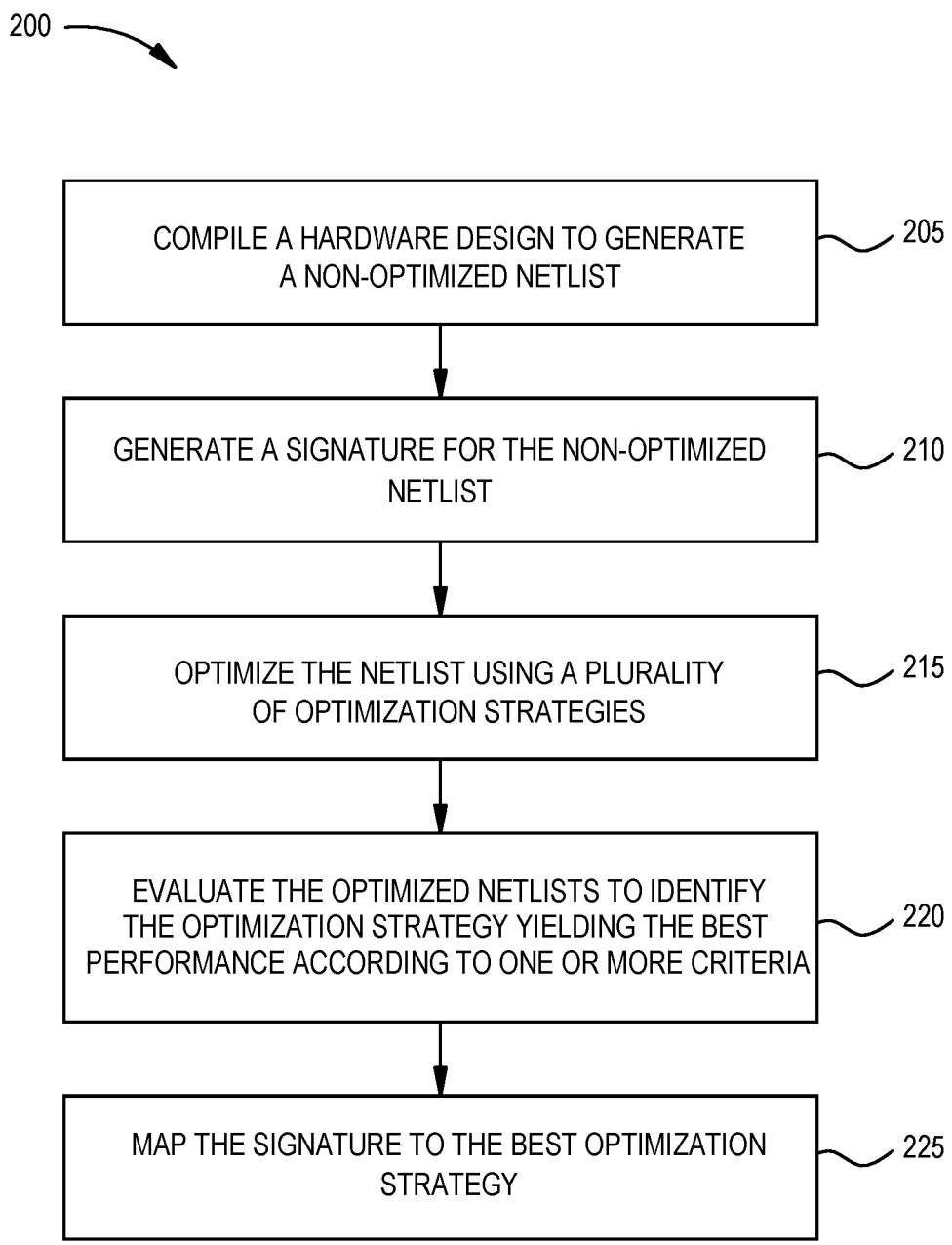
FIG. 2 is a flowchart for mapping signatures generated from a non-optimized netlist to an optimal optimization strategy, according to an example.

FIG. 2 is a flowchart of a method 200 for mapping signatures generated from a non-optimized netlist to an optimization strategy that best optimizes the hardware implementation of the netlist, according to an example. At block 205, the synthesis tool compiles a hardware design to generate a non-optimized netlist. In one embodiment, the synthesis tool performs a rough or intermediate compilation or synthesis on the hardware design to convert the HDL code (e.g., a register transfer level (RTL) design) into the non-optimized netlist.

In one embodiment, the hardware design includes multiple combinational modules. For example, the combinational modules may represent different functional blocks in the hardware design (e.g., different circuit modules in a radio transceiver, different circuit block in a processor, or different layers in a neural network). The synthesis tool can separately compile or synthesis these combinational modules and generate respective non-optimized netlists.

At block 210, the signature generator generates a signature for the non-optimized netlist. The specific embodiments for generating the signature are discussed in detail with regards to FIG. 3. In one embodiment, the technique used by the signature generator results in a pseudo-unique password where it is unlikely that two different combinational modules have the same signature. For example, the technique may result in a pseudo-unique signature that has a chance of less than one in one billion of being the same as another combinational module which has a different circuitry (e.g., different logic gates and/or connections). Thus, the method 200 can be used regardless whether the signature is guaranteed to be unique, or is pseudo-unique.

At block 215, the optimizer optimizes the netlist using a plurality of optimization strategies. That is, at this stage, the host may not know the most optimal or preferred optimization strategy for the combinational module. For example, when a new hardware design is first synthesized, the combinational modules forming the design may also be new. Thus, at block 215, the optimizer may try a plurality of different optimization strategies for each optimization module in the design.

The embodiments herein are not limited to any particular optimization strategy. Some non-limiting optimization strategies include: implementing the netlist using only XOR gates, implementing the netlist using only AND or OR gates, building the circuit using only multiplexers, building the circuit using only combinations of XOR gates and multiplexers, etc. However, the time to implement some optimization strategies may increase exponential as the size of the hardware design grows. However, using the embodiments herein, after the hardware design has been modified and again synthesized, it may require much less time to generate optimized circuit netlist since the synthesis tool does not need to identify the optimal optimization strategy for the combinational modules that remain unchanged in the hardware design.

At block 220, the optimizer evaluates the optimized netlists generated using the plurality of optimization strategies to identify the optimization strategy yielding the best performance according to one or more criteria. Stated differently, the optimizer optimizes the non-optimized netlist using each of the optimization strategies to yield respective optimized netlists. The optimizer can then evaluate these optimized netlists, according to one or more criteria to identify the optimization strategy that resulted in the best optimization. The criteria used to identify the best optimization may include identifying which of the optimized netlist has the lowest latency, the lowest power consumption, or that requires the least amount of space to implement in the IC. In other embodiments, the best optimization strategy may be identified using a combination of these criteria.

At block 225, the signature generator maps the signature generated at block 210 to the best optimization strategy identified at block 220. This mapping can then be stored in the signature database for future use.

Figure 3:
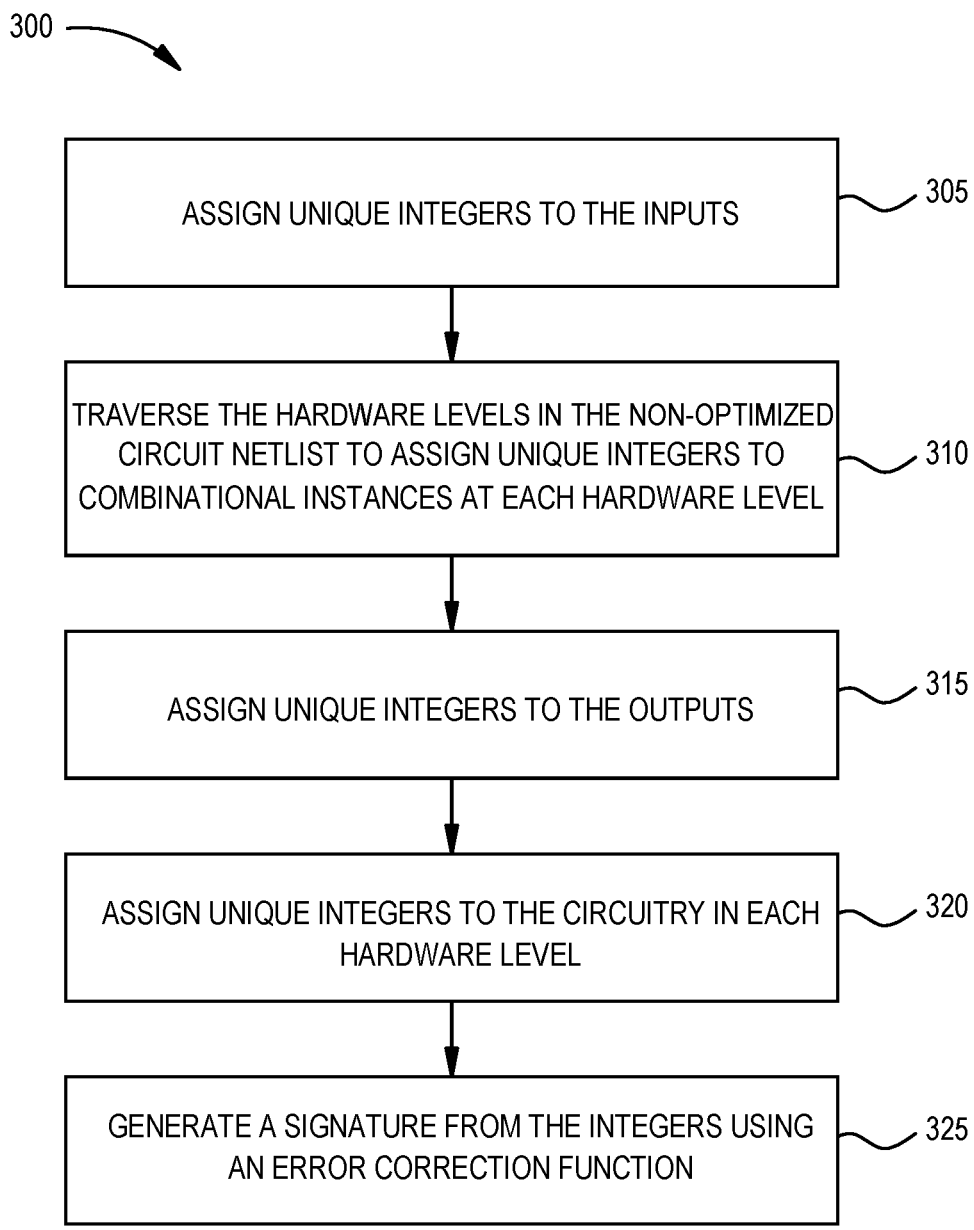
FIG. 3 is a flowchart for generating a signature for a non-optimized netlist, according to an example.

FIG. 3 is a flowchart of a method 300 for generating a signature for a non-optimized netlist, according to an example. For clarity, the blocks in the method 300 are discussed in tandem with FIGS. 4 and 5. FIG. 4 illustrates a circuit that is assigned unique integers, according to an example, and FIG. 5 illustrates circuits with circuit elements that are assigned unique integers, according to examples. While FIG. 4 and FIG. 5 illustrate logic gates, the techniques described below can also be applied to netlists that include other types of circuit elements such as LUTs.

At block 305, the signature generator assigns unique integers to the inputs of the non-optimized netlist or combinational module. FIG. 4 illustrates a combinational module 400 (which represents the circuitry defined in the non-optimized circuit netlist) that includes four inputs 405. Each of these inputs is given a unique integer—i.e., 1-4—such that each input 405 has a different integer.

In one embodiment, at block 305 the signature generator always assigns the inputs a unique integer using a repeatable technique such that each time the combinational module 400 is evaluated by the signature generator (assuming the circuitry has not changed), the same inputs are assigned the same integers. For example, the signature generator always assigns the top most input 405 a value of 1, the second top most input 405 a value of 2, and so forth. As discussed later, using the same repeatable technique to assign the integers is important to ensure that the same combinational module is assigned the same integers each time (assuming the underlying circuitry in the combinational module remains unchanged).

In one embodiment, the unique integers assigned during method 300 are unique to a particular combinational module. That is, the inputs 405 each get a unique integer; however, the inputs for a different combinational module may be given the same integer values when generating its signature. Thus, assigning unique integers does not necessarily mean the integers are unique across the hardware design but may only be unique to the particular combinational module.

At block 310, the signature generator traverses the hardware levels in the non-optimized circuit netlist to assign unique integers to combination instances at each hardware level. The combinational module 400 includes three hardware levels: Level 1, Level 2, and Level 3. Level 1 includes circuitry (i.e., NOR gate 410) which has inputs that are only from the primary inputs 405. That is, the NOR gate 410 is directly connected to the inputs 405. Level 2, on the other hand includes circuitry that receives inputs from either the inputs 405 or from circuitry in Level 1. That is, the OR gate 415A receives input from the NOR gate 410 and from the topmost input 405. The OR gate 4156 receives input from the NOR gate 410 and the bottommost input 405. Thus, Level 2 includes circuitry that receives at least one input from circuitry in Level 1.

Level 3 includes circuitry that receives inputs for either circuitry in Level 2, circuitry in Level 1, or directly from the inputs 405. In this example, the AND gate 420 receives inputs from OR gates 415A and 4156 in Level 2, but in other embodiments the circuitry in Level 3 could receive inputs from circuitry in Level 1 or directly from the inputs 405. Nonetheless, Level 3 includes circuitry that receives at least one input from circuitry in Level 2.

Each output of the circuitry in Levels 1 and 2 is a combination instance 425A. That is, the output of the NOR gate 410 is a combination instance 425A, the output of the OR gate 415A is a combination instance 425B, and the output of the OR gate 415B is a combination instance 425C. In one embodiment, the signature generator traverses one level at a time and assigns unique integers using a repeatable technique so that each time the combinational module 400 is traversed, the same combination instances 425 are assigned the same integer values assuming the combinational module 400 is unchanged—i.e., the instance 425A is repeatedly assigned a value of 5, the instance 425B is repeatedly assigned a value of 6, and the instance 425C is repeatedly assigned the value of 7. Thus, as mentioned above, each time block 310 is performed, the same integer values are assigned to the same combination instance so that the method 300 will generate the same signature for the combinational module 400.

At block 315, the signature generator assigns unique integers to the outputs of the combinational module. As shown in FIG. 4, the output 430 is assigned the integer value of 8. Thus, after performing blocks 305-315, the primary inputs 405, the combination instances 425, and the primary outputs 430 are assigned unique integers relative to each other. Moreover, the manner in which the signature generator assigned these values is repeatable so that when the same combinational module 400 is again synthesized, the signature generator assigns the unique integers values in the same way. For example, if a combinational module includes multiple outputs, the signature generator uses the same technique (e.g., moving from top to bottom or bottom to top) to assign the integers.

At block 320, the signature generator assigns integers to the circuitry in each hardware level. That is, in addition to assigning integer values to the combination instances 425 (e.g., the outputs of the logic gates), the signature generator also assigns predefined integers to the logic gates themselves. Doing so may be helpful for ensuring the two different circuits (or combinational modules) illustrated in FIG. 5 are assigned different signatures.

As shown in FIG. 5, the combinational module 500 includes an AND gate 505 with two inputs and one output while the combinational module 550 includes an OR gate 555 with two inputs and one output. After performing blocks 305, 310, and 315 of the method 300, the combinational modules 500 and 500 have the same unique integers. Thus, if the signature were calculated using only these integers, the modules 500 and 550 would have the same signature even though they are different circuitry (e.g., the module 500 has an AND gate 505 while the module 550 has an OR gate 555). As a result, the signature generator may select an optimization strategy that is not the optimal strategy. For example, because of a matching signature, the signature generator may mistakenly believe the combinational module 500 has the same circuitry as the combinational module 550 and use its corresponding optimization strategy, which may be a poor optimization strategy for the combinational module 500.

To prevent this, at block 320, the signature generator assigns different integers to the circuit elements in the combinational module. In one embodiment, the signature generator identifies a type of each circuit element and then assigns an integer to the circuit elements based on their identified type. For example, each AND gate in the combinational module may be assigned a "1", each OR gate a "2", each XOR gate a "3", each LUT a "4", and so forth. In FIG. 5, the AND gate 505 is assigned a "1" while the OR gate 555 is assigned a "2". Thus, now the set of integers assigned to the combinational module 500 is different than the set of integers assigned to the combinational module 550. As a result, a signature generated from the integers assigned to the combinational module 500 is different from a signature generated from the integers assigned to the combinational module 550.

While blocks 315 and 320 discuss assigning unique integers, in other embodiments, the integers do not have to be unique. That is, some of the integers may be duplicates. Doing so may increase the chance different combinational modules have the same signature but may mean the signature can be generated using a smaller set of integers. Further, while integers are specifically mentioned, the signature generator can assign other types of numerical values as well (e.g., numbers with decimal values) to the inputs, combination instances, and the outputs in the combinational module.

At block 325, the signature generator generates a signature for the combinational module using an error correction function. Typically, error correction functions are used to detect when digital data has become corrupted during transmission or storage (e.g., data is missing or the logical states have changed). In method 300, the error correction functions are leveraged for a different purpose—i.e., to generate a signature for identifying the same combinational module. That is, method 300 repurposes the error correction function to generate a signature for circuitry rather than detecting errors when transmitting or storing digital data.

In one embodiment, the signature generator uses the set of integers assigned to the combinational module as inputs to a cyclic redundancy check (CRC) function (e.g., one type of an error correction function) which outputs a signature—e.g., a 8 bit, 16 bit, 32 bit, 64 bit, etc. signature for the combinational module. However, using a CRC function to generate the signature is just one example of a suitable error correction function for outputting the signature. More generally, the method 300 can be used with any signature generation function (whether an error correction function or not) that can receive the integers as inputs and output a signature.

Figure 6:
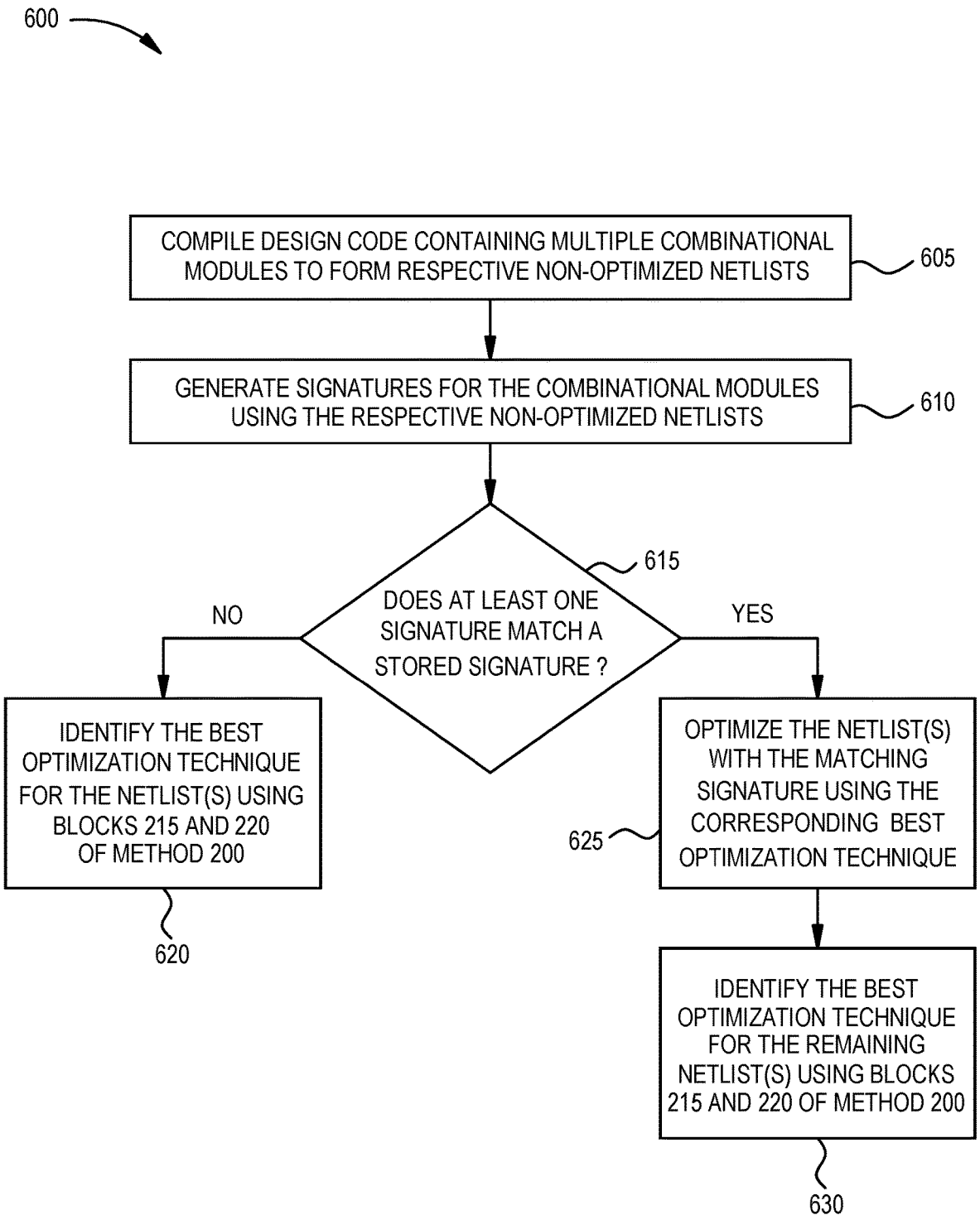
FIG. 6 is a flowchart for using signatures to select an optimal optimization strategy for combinational modules in a hardware design, according to an example.

FIG. 6 is a flowchart of a method 600 for using signatures to select an optimal optimization strategy for combinational modules in a hardware design, according to an example. At block 605, the programmer compiles design code containing multiple combinational modules to form respective non-optimized netlists. That is, the synthesis tool may perform a rough or intermediate synthesis on the design code and the various combinational modules to generate the non-optimized netlists. In one embodiment, the synthesis tool has not yet attempted to optimize the logic defined by the netlists.

At block 610, the signature generator generates signatures for the combinational modules using the respective non-optimized netlists. In one embodiment, at block 620, the signature generator performs the method 300 for each of the non-optimized netlists. Because identifying the signatures is a linear operation, generating the signatures for each non-optimized netlists does not require much computer resources or time.

At block 615, the signature generator determines whether one of the signatures generated at block 610 match a stored signature in the signature database. That is, the signature generator compares the current signatures to the signatures stored in the database to determine whether there is a match. In one embodiment, a match indicates that another combinational module with the same signature has previously been identified by the signature generator.

If there are no matches, at block 620, the optimizer identifies the optimal or preferred optimization strategy for the netlist using blocks 215 and 220 of the method 200. For example, this may be the first time a design code has been synthesized, and a result, the combinational modules may all be new.

Once the optimal optimization strategies are identified, the signature database can be updated to list the new signatures and the corresponding optimal optimization strategies. Thus, when method 600 is repeated and a combinational module has not changed, its signature will match a signature already stored in the signature database, and thus, block 215 and 220 of method 200 do not need to be repeated.

However, if there is a match, the method 600 proceeds to block 625 where the optimizer optimizes the non-optimized netlists using the corresponding optimization strategy identified in the signature database. As a result, the optimizer can quickly identify the optimal optimization strategy and use that optimization strategy to generate optimized netlists.

At block 630, the optimizer identifies the optimal or preferred optimization strategy for the remaining netlists using blocks 215 and 220 of method 200. For example, the programmer may have updated only some of the combinational modules. For the updated modules, the optimizer tries all of the optimization strategies to identify the preferred one as described in method 200. However, the optimizer can use matching signatures to identify combinational modules that were not updated and then use the already identified optimization strategies to optimize those netlists. Thus, the overall time to synthesize the design code can be substantially reduced.

Once optimized, the netlists can be used for configuring an IC. As used herein, configuring the IC includes generating a bitstream that can be used to program a programmable IC (e.g., a FPGA or a system on a chip that include programmable logic) and also includes generating masks and hardware design for fabricating a non-programmable IC (e.g., an ASIC).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method, comprising:
receiving a netlist defining a circuit comprising a plurality of circuit elements;
assigning numerical values to inputs in the circuit;
assigning numerical values to combination instances within the circuit;
assigning numerical values to outputs of the circuit, wherein the numerical values are assigned to the inputs, the combination instances, and the outputs such that each numerical value is incremented by a predefined amount relative to a previously assigned numerical value;
generating a signature for the circuit using the numerical values assigned to the inputs, the combination instances, and the outputs as inputs to a signature generation function;
determining that the signature matches a previously saved signature; and
optimizing the netlist using an optimization strategy corresponding to the previously saved signature.

2. The method of claim 1, further comprising:
synthesizing hardware design language (HDL) code to convert the HDL code into the netlist comprising the plurality of circuit elements.

3. The method of claim 1, further comprising, before determining the signature matches the previously saved signature:
determining that the signature does not match any previously saved signatures in a signature database;
optimizing the netlist using a plurality of different optimization strategies;
evaluating the optimized netlists generated using the different optimization strategies to identify an optimal optimization strategy; and
saving the signature and an indication of the optimal optimization strategy in the signature database.

4. The method of claim 1, wherein assigning the numerical values to the inputs of the circuit comprises:
assigning the numerical values using a repeatable technique such that each time the signature is generated, the inputs are assigned the same numerical values assuming the netlist has not changed.

5. The method of claim 1, wherein the plurality of circuit elements is arranged in multiple hardware levels, wherein the combination instances are intermediate outputs of the plurality of circuit elements at each of the hardware levels.

6. The method of claim 1, further comprising:
identifying a type of each of the plurality of circuit elements; and
assigning a numerical value to each of the plurality of circuit elements depending on its identified type,
wherein the signature is generated based on the numerical values assigned to each of the plurality of circuit elements.

7. The method of claim 1, wherein the signature generation function comprises a cyclic redundancy check (CRC) function that generates the signature.

8. The method of claim 1, further comprising:
configuring, using the optimized netlist, an integrated circuit to perform an operation corresponding to the circuit.

9. A host computing system, comprising:
a processor; and
memory comprising a signature generator and an optimizer, wherein the signature generator is configured to:
receive a netlist defining a circuit comprising a plurality of circuit elements,
assign numerical values to inputs in the circuit,
assign numerical values to combination instances within the circuit,
assign numerical values to outputs of the circuit, wherein the numerical values are assigned to the inputs, the combination instances, and the outputs such that each numerical value is incremented by a predefined amount relative to a previously assigned numerical value,
generate a signature for the circuit using the numerical values assigned to the inputs, the combination instances, and the outputs as inputs to a signature generation function, and
determine that the signature matches a previously saved signature, wherein the optimizer is configured to optimize the netlist using an optimization strategy corresponding to the previously saved signature.

10. The host computing system of claim 9, wherein the memory further comprises a synthesis tool configured to synthesize HDL code to convert the HDL code into the netlist comprising the plurality of circuit elements.

11. The host computing system of claim 9, wherein the signature generator and the optimizer are configured to, before determining the signature matches the previously saved signature:
determine that the signature does not match any previously saved signatures in a signature database;
optimize the netlist using a plurality of different optimization strategies;
evaluate the optimized netlists generated using the different optimization strategies to identify an optimal optimization strategy; and
save the signature and an indication of the optimal optimization strategy in the signature database.

12. The host computing system of claim 9, wherein the plurality of circuit elements is arranged in multiple hardware levels, wherein the combination instances are intermediate outputs of the plurality of circuit elements at each of the hardware levels.

13. The host computing system of claim 9, wherein the signature generator is configured to:

identify a type of each of the plurality of circuit elements; and assign a numerical value to each of the plurality of circuit elements depending on its identified type, wherein the signature is generated based on the numerical values assigned to each of the plurality of circuit elements.

14. The host computing system of claim 9, wherein the signature generation function comprises a CRC function that generates the signature.

15. A non-transitory computer readable storage medium comprising computer readable program code embodied thereon, the program code performs an operation when executed on a computer processor, the operation comprising:

receiving a netlist defining a circuit comprising a plurality of circuit elements;

assigning numerical values to inputs in the circuit;

assigning numerical values to combination instances within the circuit;

assigning numerical values to outputs of the circuit, wherein the numerical values are assigned to the inputs, the combination instances, and the outputs such that each numerical value is incremented by a predefined amount relative to a previously assigned numerical value;

generating a signature for the circuit using the numerical values assigned to the inputs, the combination instances, and the outputs as inputs to a signature generation function;

determining that the signature matches a previously saved signature; and optimizing the netlist using an optimization strategy corresponding to the previously saved signature.

16. The non-transitory computer readable storage medium of claim 15, wherein the operation further comprises:

synthesizing HDL code to convert the HDL code into the netlist comprising the plurality of circuit elements.

17. The non-transitory computer readable storage medium of claim 15, wherein the operation further comprises, before determining the signature matches the previously saved signature:

determining that the signature does not match any previously saved signatures in a signature database;

optimizing the netlist using a plurality of different optimization strategies;

evaluating the optimized netlists generated using the different optimization strategies to identify an optimal optimization strategy; and saving the signature and an indication of the optimal optimization strategy in the signature database.

18. The non-transitory computer readable storage medium of claim 15, wherein the plurality of circuit elements is arranged in multiple hardware levels, wherein the combination instances are intermediate outputs of the plurality of circuit elements at each of the hardware levels.

19. The non-transitory computer readable storage medium of claim 15, wherein the operation further comprises:

identifying a type of each of the plurality of circuit elements; and assigning a numerical value to each of the plurality of circuit elements depending on its identified type, wherein the signature is generated based on the numerical values assigned to each of the plurality of circuit elements.

20. The non-transitory computer readable storage medium of claim 15, wherein the signature generation function comprises a CRC function that generates the signature.

* * * * *